US012732043B2

(12) United States Patent
Koch et al.

(10) Patent No.: US 12,732,043 B2
(45) Date of Patent: Sep. 8, 2026

(54) ROTOR FOR AN EXTERNAL ROTOR MOTOR

(71) Applicant: BorgWarner Inc., Auburn Hills, MI (US)

(72) Inventors: Silvio Koch, Kirchheimbolanden (DE); Thomas Ramb, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 195 days.

(21) Appl. No.: 18/769,371

(22) Filed: Jul. 10, 2024

(65) Prior Publication Data

US 2025/0030291 A1 Jan. 23, 2025

(30) Foreign Application Priority Data

Jul. 21, 2023 (DE) .................... 10 2023 119 406.2

(51) Int. Cl.
*H02K 1/30* (2006.01)
*H02K 1/2791* (2022.01)

(52) U.S. Cl.
CPC ............. *H02K 1/30* (2013.01); *H02K 1/2791* (2022.01)

(58) Field of Classification Search
CPC ................................ H02K 1/30; H02K 1/279
USPC .................................................... 310/156.12
See application file for complete search history.

(56) References Cited

U.S. PATENT DOCUMENTS

| | | | | |
|---|---|---|---|---|
| RE38,601 | E * | 9/2004 | Elsasser | H02K 7/085 360/97.21 |
| 2005/0052091 | A1* | 3/2005 | Arimitsu | B60K 6/365 903/910 |
| 2005/0127768 | A1 | 6/2005 | Welke et al. | |
| 2010/0320859 | A1* | 12/2010 | Himmelmann | H02K 1/28 310/156.31 |
| 2013/0187511 | A1 | 7/2013 | Lipot | |

FOREIGN PATENT DOCUMENTS

| | | | |
|---|---|---|---|
| DE | 199 51 594 | A1 | 5/2001 |
| DE | 103 58 456 | A1 | 7/2005 |
| EP | 2 549 630 | B1 | 10/2013 |
| EP | 2 849 320 | A2 | 3/2015 |
| WO | WO 2020/000698 | A1 | 1/2020 |

* cited by examiner

*Primary Examiner* — Terrance L Kenerly
(74) *Attorney, Agent, or Firm* — Bose McKinney & Evans LLP

(57) ABSTRACT

A rotor for an external rotor motor is described. The rotor has a back iron ring made of ferromagnetic steel, permanent magnets which are fastened to an inner side of the back iron ring, and a carrier made of non-ferromagnetic material which has a hub for a shaft and is fastened to the back iron ring. According to this disclosure, the carrier has a slot into which the back iron ring is inserted.

15 Claims, 1 Drawing Sheet

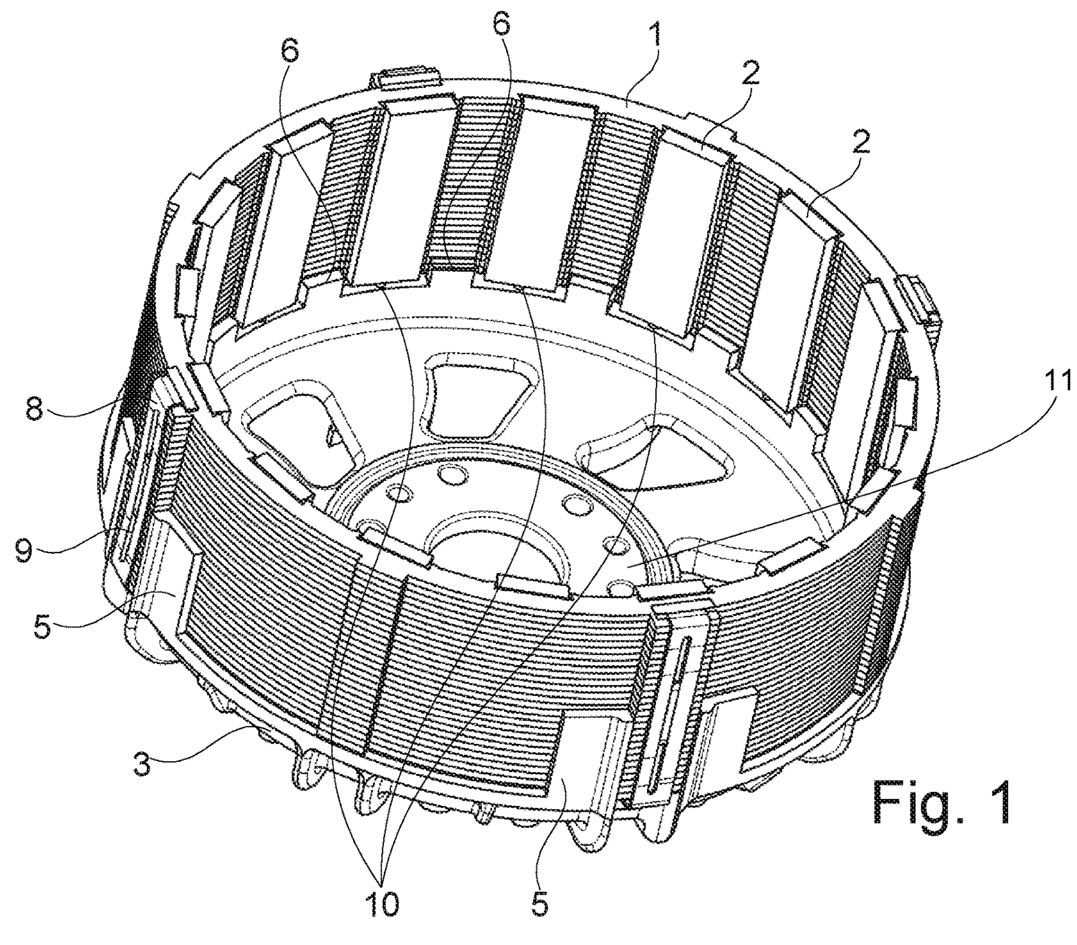
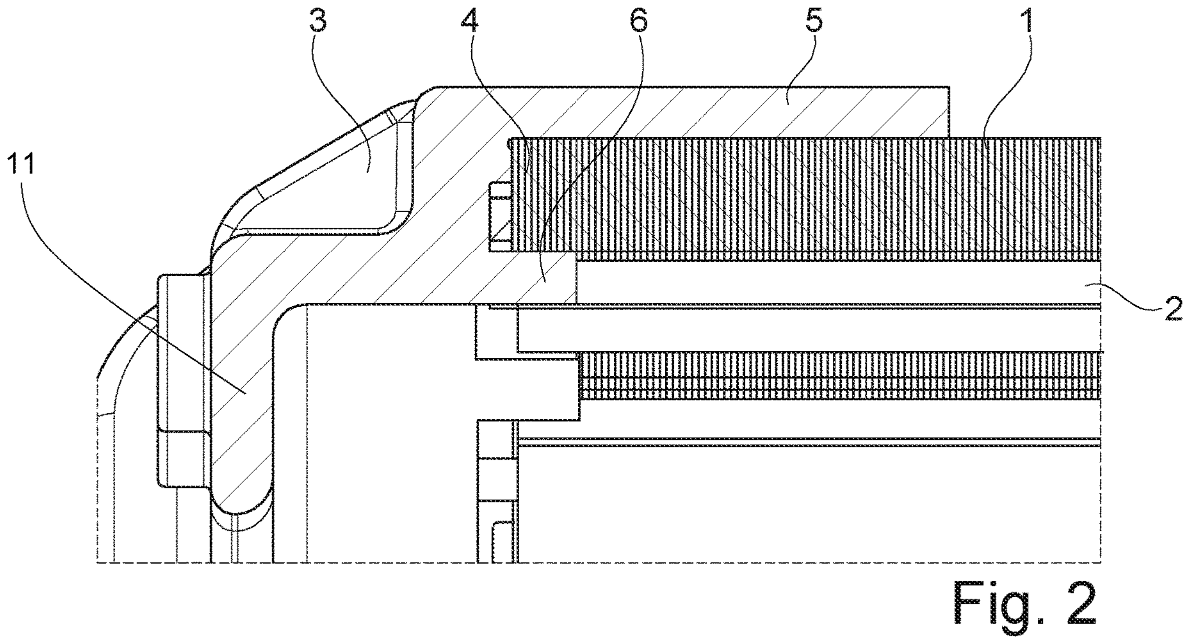
Fig. 2

ROTOR FOR AN EXTERNAL ROTOR MOTOR

RELATED APPLICATIONS

This application claims priority to DE 10 2023 119 406.2, filed Jul. 21, 2023, the entire disclosure of which is hereby incorporated herein by reference.

BACKGROUND

This disclosure relates to a rotor for an electric motor.

In a rotor for an external rotor motor, the back iron ring made of ferromagnetic material must be connected to a carrier that has a hub for a shaft. A constant problem in the manufacture of rotors is to avoid imbalance as far as possible. This problem is made more difficult by the fact that the rotor is usually subject to considerable temperature fluctuations during the operation of an electric motor, which can lead to relative movements of the back iron ring relative to the carrier and thus to imbalance.

SUMMARY

This disclosure teaches a way in which a rotor for an external rotor motor can be produced cost-effectively, in which imbalance is largely avoided even in the event of temperature fluctuations.

In a rotor according to this disclosure, the carrier has a slot into which the back iron ring is inserted. In this way, the back iron ring is guided between an inner diameter of the slot and an outer diameter of the slot in the rotor. If the carrier expands more than the back iron ring due to temperature, the back iron ring rests against an inner wall of the slot, and if the carrier contracts more than the back iron ring due to temperature, the back iron ring rests against an outer wall of the slot. In both cases, the back iron ring is reliably held concentrically to the carrier and imbalance can be largely avoided.

The slot can be an annular slot that extends continuously over the entire circumference. However, it is also possible for the carrier to have a series of slots, each of which only extends over part of the circumference.

In order to avoid imbalance even with temperature changes, a slot depth that is significantly smaller than the axial length of the back iron ring is generally sufficient. An advantageous refinement of this disclosure provides that the slot has a depth that is smaller than the axial length of the back iron ring and is preferably less than a fifth, particularly preferably no more than a tenth of the axial length of the back iron ring. In this way, material and thus weight of the rotor can be saved, which enables a more efficient electric motor.

A further refinement of this disclosure provides for the carrier to have outer protrusions that extend in an axial direction on the outside of the back iron ring. In this way, the guidance of the back iron ring can be improved with minimal use of material. Preferably, the outer protrusions only extend over part of the axial length of the back iron ring, for example, over 20 to 50 percent of the axial length of the back iron ring.

A further refinement of this disclosure provides for the carrier to have inner protrusions that extend in an axial direction on the inside of the back iron ring between the permanent magnets. In this way, the guidance of the short-circuit plate can be improved with minimal use of material. For mechanical reasons, outer protrusions are more advantageous than inner protrusions. To keep the weight of the rotor low, the inner protrusions are therefore shorter than the outer protrusions, i.e., they extend further in the axial direction than the inner protrusions.

A further refinement of this disclosure provides for a gap extending in the circumferential direction between one end face of the permanent magnets and the carrier, and for nubs of the carrier projecting into this gap. Such nubs can simplify production by serving as a stop for the permanent magnets of the rotor. In principle, it is possible to attach the permanent magnets to the back iron ring before it is inserted into the slot of the carrier. From a manufacturing point of view, however, it is generally more favorable to first insert the back iron ring into the slot of the carrier and only then attach the magnets to the inside of the back iron ring, in particular by gluing. Nubs on the carrier can then be used as a stop to make it easier to position the magnets, especially if the permanent magnets are only magnetized after they have been attached.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 1 shows a rotor for an external rotor motor; and

FIG. 2 shows a sectional view of a detail of the rotor of FIG. 1.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

The rotor shown in FIG. 1 comprises a back iron ring 1 made of ferromagnetic steel, permanent magnets 2 that are attached to an inner side of the back iron ring 1, and a carrier 3 made of non-ferromagnetic material that is attached to the back iron ring 1 and has a hub 11 for a shaft that is not shown. The carrier 3 may be made of aluminum or an aluminum-based alloy, for example.

FIG. 2 shows a sectional view of the rotor. It can be seen that the carrier 3 has a slot 4 in which the back iron ring 1 is located. As the carrier 3 and the back iron ring 1 are made of different materials, different thermal expansions can occur when the temperature changes. Since the back iron ring 1 is arranged in a slot 4 of the carrier 3, the back iron ring 1 rests against an inner wall of the slot 4 when the carrier 3 expands more than the back iron ring 1 and against an outer wall of the slot 4 when the back iron ring 1 expands more than the carrier 3. In both cases, the back iron ring 1 is held concentrically to the hub by the carrier 3, so that an imbalance can be largely avoided.

As shown in particular in FIG. 1, the carrier 3 has outer protrusions 5 which extend in an axial direction on the outside of the back iron ring 1. These outer protrusions 5 stabilize the position of the back iron ring 1 relative to the carrier 3 when the back iron ring 1 presses against the outer wall of the slot 4 and thus also against the outer protrusions 5 due to thermal expansion. The outer protrusions 5 can extend over the entire axial length of the back iron ring 1. However, it is generally advantageous if the outer protrusions 5 only extend over part of the axial length of the back iron ring 1, for example, 20% to 50% of the axial length of the back iron ring 1. In this way, reliable positioning of the back iron ring 1 relative to the carrier 3 can be achieved with reduced use of material and thus advantageously low rotor weight, thus avoiding imbalance.

The carrier 3 also has inner protrusions 6, which extend in the axial direction on the inside of the back iron ring 1 between the permanent magnets 2. The inner protrusions 6 stabilize the position of the back iron ring 1 relative to the carrier 3 when the back iron ring 1 presses against the inner wall of the slot 4 and thus also against the inner protrusions 6. The inner protrusions 6 can extend over the entire axial length of the back iron ring 1. However, it is generally advantageous if the inner protrusions 6 only extend over part of the axial length of the back iron ring 1 and, in particular, are shorter than the outer protrusions 5. In the embodiment example shown, for example, the inner protrusions 6 extend over no more than 10% of the axial length of the back iron ring 1. In this way, reliable positioning of the back iron ring 1 relative to the carrier 3 can be achieved with reduced use of material and thus advantageously low rotor weight, thus avoiding imbalance.

In the embodiment shown, the back iron ring 1 is a stack of electrical sheets, i.e., soft magnetic steel. The stacking direction is the axial direction. The sheet plane of the individual sheets in the stack therefore extends perpendicular to the axial direction of the rotor. The individual sheets of the stack are all welded together and can also carry holders 8, which extend in the axial direction of the stack and grip around its ends. Instead of being welded together, the individual sheets can also be mechanically connected to each other by means of punching packets or in some other way. The brackets 8 can also connect the stack to the carrier 3. Brackets 8 can be arranged on the outside of the stack. The weld seam 9 shown in FIG. 1 extends through the brackets 8 into the stack of sheets.

The individual sheets of the stack can be ring-shaped sheets or form only one ring segment each.

The permanent magnets 2 are glued into the back iron ring 1. In principle, the permanent magnets can be attached to the back iron ring 1 before or after magnetization. In the rotor shown, the permanent magnets 2 were first attached to the back iron ring 1 and only then magnetized. The back iron ring 1 has grooves on its inside into which the permanent magnets 2 are glued. As FIG. 1 shows, the carrier 3 has studs 10, which form stops for the permanent magnets 2 and thus facilitate assembly. During assembly, the permanent magnets 2 are pushed into the grooves of the back iron ring 1 until the end faces of the permanent magnets 2 are in contact with the studs 10. One or more studs 10 can be assigned to each of the permanent magnets 2. In the design example shown, each permanent magnet 2 is assigned exactly one stud 10. Between two adjacent inner protrusions 6, the carrier therefore has exactly one stud 10 in each case. The permanent magnets can be rare-earth magnets, for example, based on $Nd_2Fe_{14}B$.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SYMBOLS

1 Back iron ring
2 Permanent magnets
3 Carrier
4 Slot
5 Outer protrusions
6 Inner protrusions
8 Brackets
9 Weld seam
10 Nubs

What is claimed is:

1. A rotor for an external rotor motor, comprising:
a back iron ring made of ferromagnetic steel;
permanent magnets fixed to an inner side of the back iron ring; and
a carrier made of material, which has a hub for a shaft and is attached to the back iron ring, wherein the carrier has a slot into which the back iron ring is inserted and wherein the carrier has outer protrusions which extend in the axial direction on the outside of the back iron ring.

2. The rotor according to claim 1, wherein the carrier is made of an aluminum-based alloy.

3. The rotor according to claim 1, wherein the back iron ring is a sheet metal stack.

4. The rotor according to claim 3, wherein the sheets of the stack of sheets are welded together.

5. A rotor according to claim 1, wherein the outer protrusions extend only over part of the axial length of the back iron ring.

6. The rotor according to claim 5, wherein the outer protrusions extend only over 20 to 50 percent of the axial length of the back iron ring.

7. The rotor according to claim 1, wherein the carrier has inner protrusions which extend in the axial direction on the inside of the back iron ring between the permanent magnets.

8. The rotor according to claim 7, wherein the outer protrusions extend further in the axial direction than the inner protrusions.

9. The rotor according to claim 1, further comprising a gap extending in the circumferential direction between one end face of the permanent magnets and the carrier, and nubs of the carrier project into the gap.

10. The rotor according to claim 9, wherein each of the permanent magnets rests against exactly one of the nubs.

11. A rotor according to claim 1, wherein the slot has a depth which is less than the axial length of the back iron ring.

12. The rotor according to claim 11, wherein the slot has a depth which is less than one fifth of the axial length of the back iron ring.

13. The rotor according to claim 11, wherein the slot has depth which is not more than one tenth of the axial length of the back iron ring.

14. The rotor according to claim 1, wherein the slot is annular.

15. The rotor according to claim 1, wherein the permanent magnets are attached to the back iron ring by means of adhesive.

* * * * *